United States Patent [19]

Takeuchi

[11] Patent Number: 4,818,095
[45] Date of Patent: Apr. 4, 1989

[54] SPECIAL LENS AND GLASSES EQUIPPED WITH THE SAME

[76] Inventor: Kunio Takeuchi, 1-61, Nishi 1-chome, Minami 11-Jho Chuo-ku, Sapporo-Hokkaido, Japan

[21] Appl. No.: 876,891

[22] PCT Filed: Jan. 4, 1985

[86] PCT No.: PCT/JP85/00002
§ 371 Date: Jun. 19, 1986
§ 102(e) Date: Jun. 19, 1986

[87] PCT Pub. No.: WO85/03140
PCT Pub. Date: Jul. 18, 1985

[30] Foreign Application Priority Data

Jan. 4, 1984 [JP] Japan ............................ 59-000148
Feb. 6, 1984 [JP] Japan ............................ 59-020530
Feb. 25, 1984 [WO] PCT Int'l Appl. ... PCT/JP84/00067

[51] Int. Cl.$^4$ ........................ G02C 7/12; G02B 5/30
[52] U.S. Cl. .................................. 351/159; 350/399; 350/407; 351/49; 351/163
[58] Field of Search .................... 351/159, 163, 49; 350/399, 407

[56] References Cited

U.S. PATENT DOCUMENTS

| | | | |
|---|---|---|---|
| 2,323,518 | 7/1943 | Cochran | 351/49 X |
| 3,211,047 | 10/1965 | Heimberger | 351/49 X |
| 3,711,417 | 1/1973 | Schuter | 351/159 X |
| 4,099,858 | 7/1978 | Land | 351/49 X |
| 4,149,780 | 4/1979 | Young | 350/407 X |
| 4,261,656 | 4/1981 | Wu | 351/163 |

Primary Examiner—John K. Corbin
Assistant Examiner—Scott J. Sugarman
Attorney, Agent, or Firm—Fred Philpitt

[57] ABSTRACT

The effect of the glasses of this invention is estimated and is summarized as follows:

(1) The effect of reducing the consciousness of eye fatigue is seen.
(2) There is a tendency that the mental subjective symptoms are reduced.
(3) Because the sense of fatigue is reduced, concentration becomes easier and it is presumed that it is helpful in preventing irritation and weariness.

Since fatigue differs depending on the length of working time, it seems to be necessary to take into consideration the effect due to other fatigue than eye fatigue and the effect of motivation. It seems also necessary to investigate under different conditions the latent fatigue which has not been covered in this report.

9 Claims, 4 Drawing Sheets

SPECIAL LENS AND GLASSES EQUIPPED WITH THE SAME

FIELD OF THE INVENTION

The present invention relates to lenses for glasses having a polarizing effect and to glasses equipped with the special lenses, and more particularly, relates to lenses for glasses having an effect of keeping repose of the pupil by making the upper portion of the lenses to be brighter than the lower portion and to glasses equipped with the lens.

BACKGROUND OF THE INVENTION

As computerization develops and office automation as well as factory automation progress in every field, the problem has been posed in Japan and Western countries that the degree of fatigue experienced by operators who are engaged in VDT operation is higher than that of clerical employees who are engaged in general office work and VDT operations pose a stronger risk of causing illness. The illnesses that have been reported include:
1. Symptoms related to the eyes
2. Symptoms related to the organs of locomotion
3. Spiritual symptoms
4. Skin symptoms
5. Abnormality of reproductions.

The symptoms relating to the eyes in connection with the new technologies related to this invention will be described in the following in detail.
   (i) Fatigue or strain of the eyes and physical disorder and feelings of displeasure around peripheral portions of the eyes, and
   (ii) Abnormality of the eyesight such as deterioration of eyesight, an object is seen as a doubled image and images become dim.

These reports are made by the following institutions:
Report of National Labor Safety and Hygiene Institute of Sweden, 1973.
   Report of London University, England, 1978.
   Report of Studies of Cakir of West Berlin University, 1978.
   Report of National Labor Safety and Hygiene Institute of of USA, 1980.
   Report of Studies of Elias of France, 1980.

In Japan, a report published in the edition of May 2, 1983 of Nikkei Computer Magazine set forth the results of an inquiry investigation conducted by the magazine to users of computers in 1983. There were responses from 2,101 persons who, and excluding 86 persons responded as non-operators of the VDT, in the responses of symptoms of which the patients were conscious, of the 2,015 VDT users, 69.2% complained about fatigue of the eyes, 39.6% complained about fatigue of the nape, 25.3% complained about strain of the eyes, and 22.0% complained about obscure vision of an object once in a while. Complaints about symptoms of the eyes ranked high.

As countermeasures against these symptoms, the following actions are considered in Japan and Western countries.
   (i) Taking a rest after operation for a fixed time.
   (ii) Illumination of a working place.
   (iii) Using office furniture such as a working table giving due regard to an operator's posture.
   (iv) Putting into effect a health diagnosis.

Of course, the foregoing points of improving a work environment are important, but there are differences between individuals as far as operators working in the operations are concerned, and at present, there is no decisive countermeasure.

The VDT operations by an operator of a computer are classified into a data input operation in which data is inputted while viewing various kinds of slips and manuscripts which are coded by characters, digits, classification symbols with attention to characters, digits, drawings and the like displayed on a display screen, and a dialogic operation with the computer which takes place while viewing data displayed on the display screen upon calling information inputted to the computer by the operation of a keyboard and a new data manuscript for newly classifying and amending the data.

In order to perform these operations, the operator is required to view the three portions comprising an information display device (display screen), an information input device (keyboard) and an information source (slips or manuscripts for input). The photowaves converted from electronic signals representing characters, drawings and the like on the display screen enter the naked eyeballs of the operator, and are concentrated in yellow spot sections of their eyeballs, and the operator is required to use the optic nerves to the utmost limit in the process of reading and understanding the display.

However, since the electronic waves repeat strong and weak fluctuations in each instant, the brightness of the electronic display is not equalized, and the display fluctuates and vibrates steadily which is not stable and moreover, infrared rays and ultraviolet rays generated from the display screen enter the eyeballs of the operator.

When they are composite, they constitute the causes for asthemnopia, weakening of the eyesight and exhaustion of the physical strength.

The three portions (information display device, information input device and information source) to which the operator gases steadily are different in the degrees (illumination) of brightness, and the human eyes have functions of automatically adjusting the bundle of rays entering the eyes by the degrees of the brightness.

In the VDT operations where the operator gases steadily to the three portions whose brightnesses are different, fatigue of the eyes such as weariness, strain, and irritation occur.

BRIEF SUMMARY OF THE INVENTION

The description of a principle of this invention will be described as follows. One of the reasons for causing the asthenopia such as eye fatigue, eye strain and eye irritation and the like is considered to be based on astigmatism.

The astigmatism means the condition in which normally, the curve of the cornea sometimes, the curve of the crystalline lens is not a proper spherical surface so that the bundle of rays entering the eyes do not make spherical refraction, and do not form a focal point at one location. Now, assuming that the eye cornea is curved, the description of the astigmatism will be provided.

FIG. 1 shows a model view of refraction of light by the astigmatism. 1 is the first principal meridian plane, 2 is the second principal meridian plane, 3 is the first principal medidians (weak principal meridians), 4 is the second principal meridians (strong principal meridians), 5 is the first focal line (front focal line), and 6 is the second focal line (rear focal line).

The spherical surface formed by the first principal meridians and the second principal meridians becomes the eye cornea. The meridians whose refractive power is the weakest are called the first principal meridians (weak principal meridians), and the meridians whose refractive power are the strongest is called the second principal meridians (strong principal meridians), and both the meridians always intersect at right angles. The plane including the first principal meridians is called the first principal meridian plane, and the plane including the second principal meridians is called the second principal meridian plane, and in FIG. 1, the vertical principal meridian plane is the first principal meridian plane, and the lateral principal meridian plane becomes the second principal meridian plane.

The vertical light (the light contained in the first principal meridian plane) passes the weak principal meridians of the eye so that the degree of the refraction is the weakest, and accordingly, the focus is formed at the most rear part, but at this location, the lateral light (the light contained in the second principal meridian plane) is in a diffused condition again after focusing once so that at this location, the laterally long and slender focal line (focal line contained in the second principal meridian plane) is formed and this line is called the second focal line (rear focal line). Similarly, the light contained in the second principal meridian plane forms the focal line contained in the first principal meridian plane, and the position becomes forward of the second focal line, and this focal line is called the first focal line (front focal line).

The cause of producing these phenomenona is called the astigmatism.

The astigmatism forms the image projected on the retina to be duplicated, and it is understood that the astigmatism is the largest factor for causing eye fatigue.

FIG. 10 is a model view of an eyeball.

In the stricture of the eye, there is the iris in front of the crystalline lens, and in its center portion, there is a hole of almost circular shape. This hole is, namely, the pupil. The bundle of rays entering the eye through the cornea is permitted to pass by the pupil, and an image is projected on the retina.

The pupil shows the reaction against the bundle of rays entering the eye, and performs the function of making the pupil larger or smaller (the sphincteral and dilative phenomenon of the pupil) according to the degree of brightness. The foregoing function is called the movement of the pupil, and the function is caused by the two muscles, the pupil sphincteral muscle and the pupil dialating muscle located in the iris.

From the three locations of close observation by the operator's gaze working in the VDT operation, lights of different qualities are emitted. The information display device (display screen) makes a display by utilizing the principle of emitting fluorescence when electronic rays are impinged on a fluorescent substance, and the display itself is represented by the brightness of the fluorescence. Many of the information sources (INPUT data) include characters, digits, and symbols displayed on a white sheet of paper. Also, the information input device (keyboard) includes characters, digits, and symbols displayed on the synthetic resin (mostly in ivory or gray). The two devices other than the information display device are different from the information display device, and the devices themselves do not produce fluorescence. They display the information by two kinds of lights by rough classification, confirming contents by the reflection of ambient lights. As will be obvious from these conditions, attention is paid to the fact that the degrees of brightness of the portions to this the operator gazes steadily are different.

As described in the structure of the eye, the sphincteral and dilative phenomenon of the pupil produced by the degrees of brightness occurs by the sphincteral muscle and the dialating muscle of the pupil. The reason for the problems such as the eyes of the operator engaged in the VDT operation experiencing more fatigue than the eyes of the general clerical employee is that the load is applied to the two muscles of the pupil, and as a matter of course, it constitutes a factor of the phenomenon that the eyes experience the fatigue. According to an experiment in which attention is paid to the shifting of the operator's gaze to the information display device, the information input device, and the information source, and an operator's observation is made, the operation is confirmed to be done at a low position of the information input device and the information source in relation to the information display device as far as the operation arrangement is concerned. The eyeball movement is examined, and as a result, when the operator gazes steadily at the information display device, although depending on the position at which the device is placed, the operator's gaze is either horizontal or slightly downward, and when the operator's gaze is directed to the information input device and the information source, the operator's gaze is in a downward direction, and the eyeballs make vertical movements frequently. As a result of measurement of the degrees of the brightnesses of the three devices, the information display device is found to be of low illumination in relation to the other two devices.

BRIEF DESCRIPTION OF DRAWINGS

In FIG. 10, 1e is the eye cornea, 2e is the iris, 3e is the pupil, 4e is a crystalline lens, 5e is a glass member, 6e is the retina.

FIG. 14 is a Y-G character examination.

PREFERRED EMBODIMENTS OF THE PRESENT INVENTION

Figure 1:
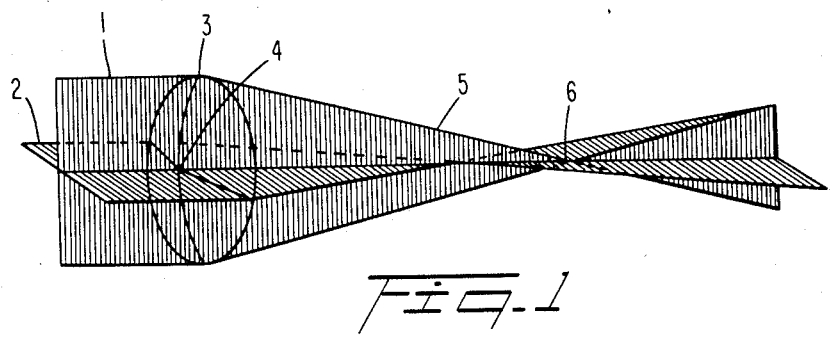
FIG. 1 is a model view of light refraction of astigmatism. 1 is the principal meridian plane, 2 is the second principal meridian plane, 3 is the first principal meridians (weak principal meridians), 4 is the second principal meridians (strong principal meridians), 5 is the first focal line (front focal line), and 6 is the second focal line (rear focal line).
Figure 2:
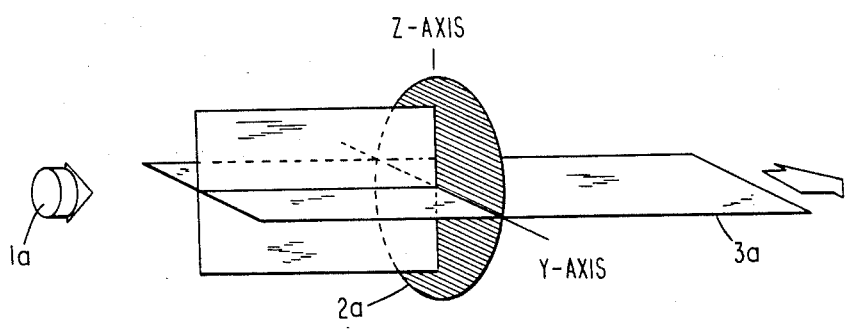
FIG. 2 is a model view of a polarization of a bundle of natural rays. 1a is a bundle of natural rays, 2a is a polarizer, 3a is a polarization.
Figure 3:
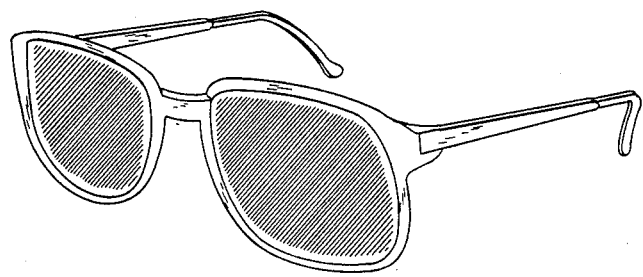
FIG. 3 is a pair of glasses including a polarizer. The polarizer is not seen as aslant lines shown by the drawing but for the sake of expression, the aslant lines are used. This is applicable to FIGS. 4 and 5.
Figure 4:
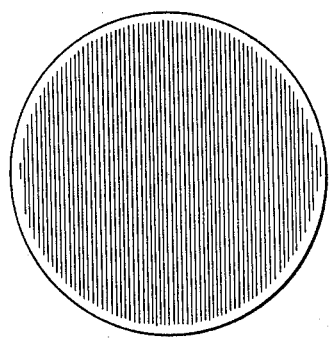
FIG. 4 is a special lens whose astigmatic angle is assumed to be 180°.
Figure 5:
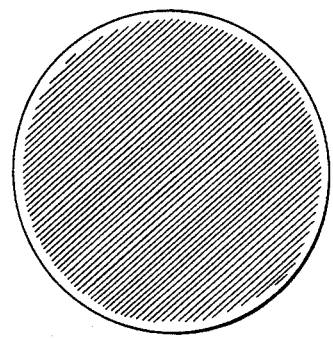
FIG. 5 is a special lens whose astigmatic angle is assumed to be 150°.
Figure 6:
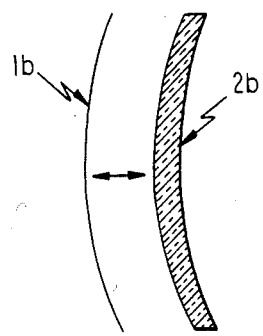
FIG. 6 is a cross section of a special lens before its bonding, and 1b and 2b are bonded by a bonding agent. 1b is a polarizer, 2b is a lens for a pair of glasses, and this is applicable to FIG. 7, FIG. 8 and FIG. 9.
Figure 7:
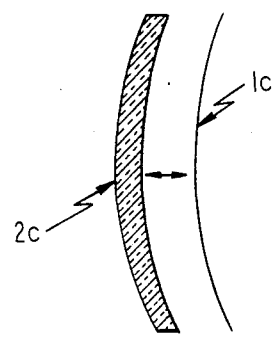
FIG. 7 is a cross section of a special lens before its bonding, and 1c and 2c are bonded by a bonding agent.
Figure 8:
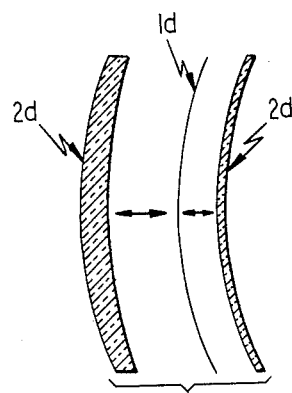
FIG. 8 is a cross section of a special lens before its bonding, and 1d and 2d are bonded by a bonding agent.
Figure 9:
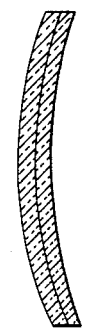
FIG. 9 is a cross section of a special lens. All the drawings, from FIG. 6 to FIG. 9 are shown so that the right side is the eyeball side.
Figure 10:
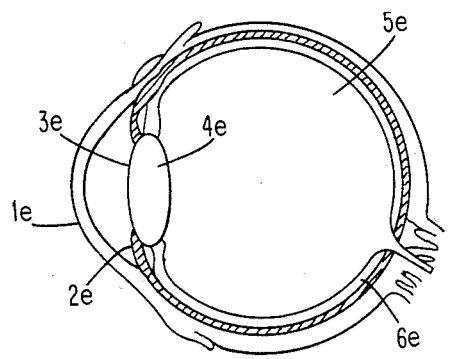
FIG. 10 is a horizontal cross section of the eyeball. Facing the drawing, the upper side is the ear side, and the lower side is the nose side.
Figure 11:
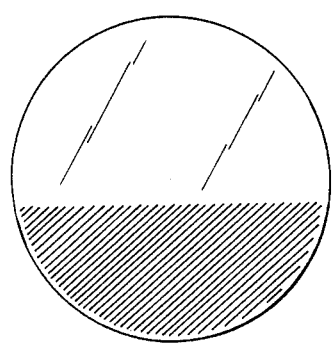
FIG. 11 is a special lens.
Figure 12:
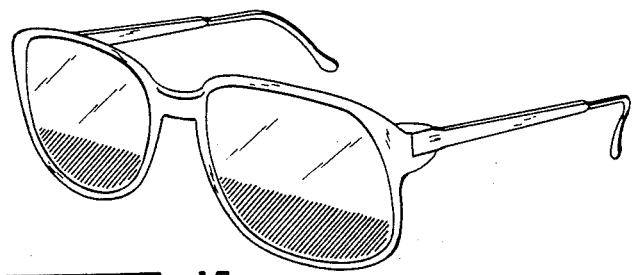
FIG. 12 is a a pair of glasses using the special lens of FIG. 11. The aslant lines in FIG. 11 and FIG. 12 represent the degree of brightness, and show that the portion with the aslant lines is less bright than the portion not applied with the aslant lines.

It is not too much to say that most human beings have the distortion of the eyeball which becomes a cause of astigmatism. But, a requirement of the correction is a problem dependent on its degree. This invention is to provide an effect of projecting a clear image on the retina of an operator engaged in the VDT operation, to decrease the partial bundle of rays entering the eyeballs by demonstrating the effect of elimination of the bundle of rays of the polarizer as shown in FIG. 2, to reduce the burden of the eyeballs and to reduce the partial eye fatigue by incorporating the polarizer of an angle into the lens of the glasses with said angle being the angle produced by adding 90° to the astigmatic angle when the astigmatic angle is from 0° to 90°, and said angle being the angle produced by subtracting 90° from the astigmatic angle when the astigmatic angle is from above 90° to 180°, by measuring and calculating the astigmatic angle of the eyeballs of the basis of this astigmatism.

Professor Sadatsugu TAGAWA, ophthalmology, Sapporo Medical College established by Hokkaido-Cho has disclosed comments on the basic theory of this new technique as follows.

"Due to the difference in luminance among the CRT video screen of word processors, etc., keyboard and paper, the pupils of the eyes repeatedly dilate and contract, and this is thought to be the cause of asthenopia. To combat this situation, it is necessary to prevent eye fatigue by coloring the upper part of the glasses light and the lower part dark, thus balancing the luminance of the images coming from both sides and reducing irritation of the pupils.

When polarizing membranes are incorporated in the above glasses to prevent the entry of the diffused reflected light entering from the CRT picture surface into the eyes, if the operator of the word processor, etc. is astigmatic, the meridian of the polarizing membrane should be in parallel with the weak main meridian of the astigmatic glasses. The image on the retinas is most than at its clearest, thus helping to alleviate eye fatigue. This has been confirmed in experiments.

The above conditions can be satisfied by the newly developed special glasses in accordance with this invention."

This special lens is certified as the most excellent lens from the standpoint of ophthalmology.

This invention has achieved the partial reduction of the eye fatigue by decreasing the pupil sphincteral and dialative phenomenon when the operator engaged in the computer VDT operations makes use of the glasses whose lens's upper part is brigher than that of the lower part. In case the operator has nearsight, farsight, and/or astigmatism, the operator wears the glasses, the properly corrected lenses of which are applied with the similar processing.

Teijiro SAKURAI, Chief Researcher, Hokkaido Labor Accident Occupational Disease Research and Countermeasure Center disclosed his comments as follows.

"If we investigate the actual test results with the cooperation from the clinical side, reduced sight is most conspicuous, and in an extreme example, a person who was engaged in VDT work for one year and 6 months (not full time but including the ordinary clerical work from time to time) suffered reduced sight of both eyes from 0.9 to 0.2 after one year, while another person who was engaged in VDT work for 2 years (full time for about one year and 2 months but now a mixture with ordinary clerical work) suffered reduced sight of both eyes from 1.5 to 1.2, and the general tendency is that the eyesight is reduced in 1-2 years after starting VDT work. To what extent the length of working time is directly related to the reduction of eyesight will be an important subject for future study.

Why is visual function affected? There are complicated contributing processes and factors affecting visual function, and in the case of the VDT, the following 4 different places differ in position and angle.

1. Manuscript
2. Keyboard
3. Screen
4. Printer

In the case of the letters on the CRT, usually the letters are yellow on a pinkish background, black on white background or green on black background.

Shadow mask spacing:
for home use: 0.6 mm
accuracy: 0.3 mm
super-high fine accuracy: 0.2 mm The problem is that the dot system is used to display the letters on the CRT and flickering occurs on the display which greatly increases eye fatigue.

If we consider the size of the CRT, the smaller the CRT, the less the flickering on the display, but in this case, the letter size becomes smaller, and the operator must concentrate on the letters to read them, and as a result, one's neck and shoulders are strained and become stiff.

If the CRT is made larger, the letters become bigger and easier to read, but in this case, the flickering increases, and as a result, eye fatigue increases.

If we consider the easy reading as a standard, tthe appropriate size of the CRT will be a minimum of 12 inches.

Then, as aforementioned, increased flickering is unavoidable. In addition, for the monitoring operator, eye control, gaze control, dilation and contraction of pupils, and adjustment of focus must function simultaneously, and the difference in image forming position due to wavelength, color phase irregularity, bleeding due to focus difference and pattern difference will occur. That is, it is considered that the highly strained nerve and the tonus muscle and other adverse effects on the system become interwined to cause further deterioration. Thus VDT work is considered to be one inlet for the eyes (eye function) to deteriorate such ecological reactions, and consequently it becomes necessary to protect the eyes/eye function of the operator.

Of course, the VDT work involves various effects such as flickering on the CRT, color phase irregularity of each operator, ultraviolet rays, electromagnetic waves and X-rays, and the filter installed in front of the CRT to protect the eyes has an effect of absorbing the room light and external sunlight thus improving the contrast and preventing glare, but it alo reduces the brightness of the letters.

Presently, in order to cut ultraviolet rays, reduce flickering and to prevent glare, glasses with polarizing lenses using polarizing membranes to match the eye sight of the operator are desired, i.e. from the viewpoint of the operator, the eye function must be placed under uniform conditions when he must monitor or confirm the aforementioned 4 different places, and the development of such glasses to meet the eyes of the VDT operator will contribute to industrial health.

By accumulating such efforts, I think it is necessary to promote measures to prevent health troubles due to VDT work which involves various industrial health problems."

Atsushi MARUYAMA, Director/Doctor of Gorinhashi Obstetrical, Gynecological and Pediatrical Hospital at Minami-ku, Sapporo-shi disclosed his comments as follows.

"Various troubles suffered by those whose work involves staring at the CRT screen of computers, etc. have arisen. In our hospital, too, computers are inevitably used for accounting and insurance billing works and we are very much concerned about how to maintain the health of those who are engaged in such work.

Worldwide, microwaves emitted from CRTs pose a problem and protective clothes have been devised. But we cannot limit the cause of such trouble to microwaves.

Occupational troubles include both physical and mental troubles, and for physical troubles, it is rather easy to clarify the cause so long as we consider microwaves, etc. which are measurable, but mental troubles pose a very difficult problem because individual differences are involved.

In the case of women who have specific visual facts such as menstruction and pregnancy, it is easier than in the case of men to statistically process by paying attention to whether the troubles are attributable to the occupation, and many reports have already been published.

(1) Menstrual irregularity is often experienced by working women. (Table 1)
(2) By type of work, it is experienced more by kindergarten teachers and beauty experts. (Table 2)
(3) Miscarriage and premature delivery are often found among hospital nurses, clerical workers, store clerks and farmers. (Table 3)
(4) Numerous past daa show that miscarriage is more common among barber/hairdressers and telephone operators. (see FIG. 13)
(5) So long as deformed children are concerned, no difference is recognized between working women and housewives. (Table 4)

From the above, it is easily known that physical labor does not necessarily cause abnormality. The abnormality is often found in the type of work which restrains the body for a certain time and requires a very precise and quick action.

If we consider the contraction of the muscles on which our actions are based, it is known that repetition of an action discharges a substance called ATP and absorbs it again. ATP is recovered in two ways, i.e. by burning glycogen and reconstituting it into lactic acid and by converting glycogen and fat into carbon dioxide and water. The former process is called anerobic and the latter aerobic. In the anerobic process, strong power, quick action and precise action can be obtained, but the accumulation of lactic acid makes it impossible for the muscle to contract in a short time, and in the aerobic process, long time action can be achieved, but strong power and precise action cannot be obtained. In such a case, fatigue does not pose a problem because it is solved through the ingestion of foods. Therefore, the problem will be the enduring time of the anerobic labor in which the lactic acid is accumulated. From such a viewpoint and also in view of the case in seeing and balance with various surrounding objects, it is considered to be ideal and somewhat easier to eliminate the anerobic element to use the glasses with astigmatic angle to meet the individual difference than to use a screen."

From the foregoing comments, this invention proves that the lens by this invention is excellent in view of obstetrical and gynecological standpoints as well as the facts that the women engaged in the VDT operations have much more miscarriages and deformity which are posing problems in Western countries.

TABLE 1

| Data |  |
|---|---|
| Working/Not Working and Frequency of Menstrual Irregularity | |
| Working women Number of investigation examples (frequency) | Home women Number of investigation examples (frequency) |
| 3,497 (20.6%) | 8,345 (14.9%) |
|  | (P < 0.005) |

TABLE 2

| Frequency of Menstrual Irregularity by Type of Work | | |
|---|---|---|
| Nurse, midwife | 16.6% | |
| Teacher | 16.1 | |
| Kindergarten teacher | 22.5 | (P < 0.005)* |
| Clerical worker | 15.9 | |
| Store clerk | 17.2 | |
| Self-employed person | 13.1 | |
| Beauty expert/barber | 35.0 | (P < 0.05)* |
| Factory worker | 15.6 | |
| Doctor, pharmacist, engineer | 12.2 | |
| Farmer | 16.7 | |
| Housewife | 14.9% | |

*Comparison with housewife

TABLE 3

| Frequency of Miscarriage/Premature Delivery by Type of Work | | |
|---|---|---|
| Nurse, midwife | 8.9% | (P < 0.005)* |
| Teacher | 6.0 | N.S. |
| Kindergarten teacher | 6.0 | N.S. |
| Clerical worker | 7.7 | (P < 0.005) |
| Store clerk | 8.2 | (P < 0.05) |
| Self-employed person | 8.2 | N.S. |
| Farmer | 11.7 | (P < 0.05) |
| Housewife | 5.5 | |

*Comparison with housewife
N.S.: No significant difference

Figure 13:
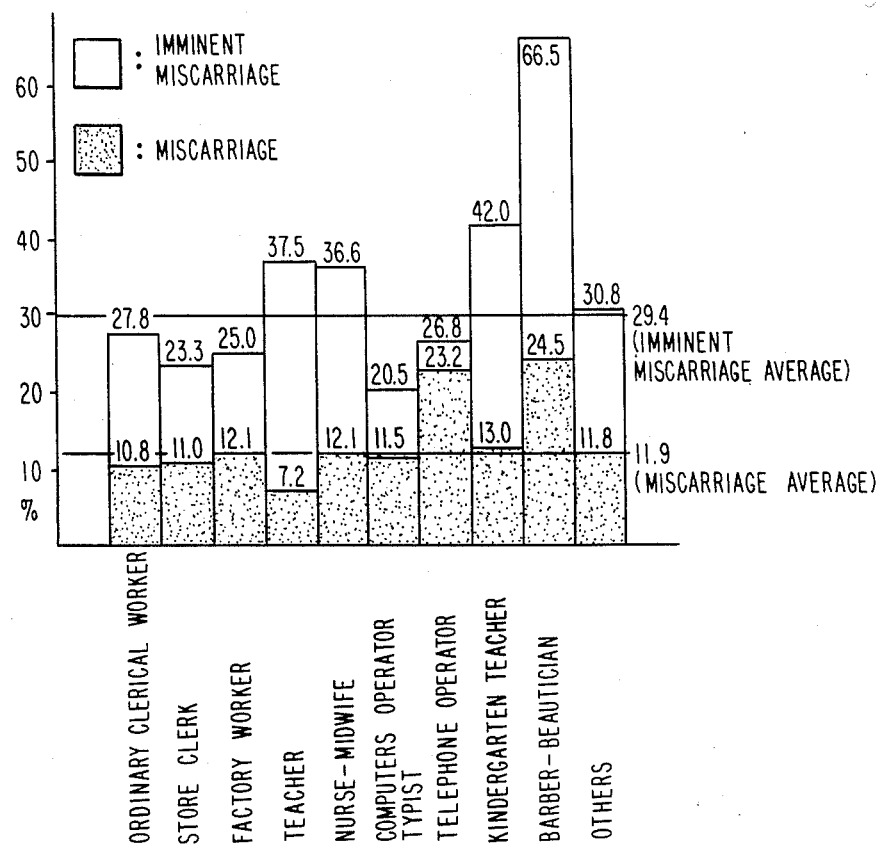
FIG. 13 is a graphical comparison showing imminent miscarriage rate and miscarriage rate by type of work.

FIG. 13 illustrates the imminent miscarriage rate and the miscarriage rate based on the type of work.

TABLE 4

| contents of VDT operation | Sex | age | degree of shortsightedness right | degree of shortsightedness left | degree of astigmatism right | degree of astigmatism left | degree of astimatic angle right | degree of astimatic angle left | limit of not used | limit of used |
|---|---|---|---|---|---|---|---|---|---|---|
| medical clerical work (accounting) | woman | 26 | −1.00 | ±0.00 | ±0.00 | ±0.00 | 180 | 180 | minute 60 | minute 250 |
| medical clerical work (recept) | woman | 28 | −3.75 | −2.00 | −0.75 | −1.75 | 5 | 175 | 40 | 200 |
| medical clerical work (reception) | woman | 23 | −3.50 | −3.50 | ±0.00 | ±0.00 | 180 | 180 | 50 | 200 |
| client control | woman | 21 | −2.00 | −1.25 | ±0.00 | ±0.00 | 90 | 90 | 50 | 180 |
| sales control | man | 24 | ±0.00 | ±0.00 | −0.75 | −0.75 | 180 | 180 | 45 | 260 |
| purchase control | man | 29 | ±0.00 | ±0.00 | ±0.00 | ±0.00 | 90 | 90 | 60 | 300 |
| program input | man | 31 | ±0.00 | ±0.00 | ±0.00 | ±0.00 | 90 | 90 | 60 | longer than 300 |
| document preparation | man | 33 | −3.25 | −3.50 | −0.50 | −0.50 | 175 | 5 | 45 | 250 |
| accounting process | man | 34 | ±0.00 | ±0.00 | ±0.00 | ±0.00 | 90 | 90 | 60 | longer than 300 |
| document preparation | man | 38 | ±0.00 | ±0.00 | −2.00 | −1.00 | 90 | 90 | 40 | 300 |

Working/Non Working Adults and Newborn Babies

| | Working woman No. of study examples (Frequency) | Housewife No. of study examples (Frequency) | Significant difference |
|---|---|---|---|
| Suspended animation | 3,464(7.9%) | 8,293(6.6%) | P 0.05 |
| Serious jaundice | 3,464(6.0%) | 8,293(5.9%) | N.S. |
| Respiratory troubles | 3,464(2.5%) | 8,283(2.3%) | N.S. |
| Congenital deformity | 3,464(2.5%) | 8,293(2.3%) | N.S. |

N.S.: no significant difference

INDUSTRIAL APPLICABILITY

Nowadays, computerization is rapidly moving and development of compact and low cost personal computers and innovation of microelectronics accelerate office automation and factory automation at a much faster pace and such trends are invading households.

With respect to the applicability of the computers, the general classification is as follows.
- a. data input operation
- b. document preparation work work by Japanese work processors
- c. work attending at the window sales of air tickets and handling of deposits
- d. editing, publishing work editing newpaper, books
- e. information guide, reservation work reservation work of air tickets
- f. book type keyboard operation work attending a the window of National Railways
- g. technical operation program preparing work for computer
- h. process control work process control work in factor, etc.

The computers are used in each industrial field as shown above.

It is not too much to say that the utilization of the computers is not possible without the use of VDT (Visual Display Terminal). The lens of this invention has a wide range of applications as not only glasses for computer VDT operations but also sunglasses for industrial purposes, such as welding.

EFFECT OF THE INVENTION

As a result of comparison experiments on the limit of feeling of fatigue when glasses employing the special lenses of this invention are used in the VDT operations and when the glasses are not used, the data of the following Table are obtained.

As a result of this experiment, when not using the glasses all persons having astigmatism complain about the eye fatigue within one hour of the operation time, and even the persons without astigmatism complain about the eye fatigue within one hour and a half.

When using the glasses, all the persons are confirmed to have an extension of time or more than three times the case when the glasses are not used. It will be obvious from this fact that when persons are engaged in the VDT operations and using the glasses equipped with the special lenses of this invention, this invention is effective in reducing the eye fatigue.

This is based on the facts that the range of light passing the lens becomes a constant, and the correction of the astigmatism becomes possible, and for the grasp of the image focussed on the yellow spot of the eyeball, an excessive concentration of optic nerve is not required, and the contracting motion of the crystalline lens is not different from the ordinary condition.

Also, Makoto TOYOSHIMA, Psychological and Clinical Examination Engineer who wore the glasses of this invention and conducted the VDT operation and collected the data disclosed his comments on the collected data as follows, and proved the effect of the glasses of this invention.

"As the human being is called a "visual animal", the visual culture is especially developed. It is because the sight was especially superior among the sensory systems, just as a right-handed person uses his right hand frequently.

But in the modern age, the amount of information coming through the eyes is too much and it may be more than the applicable limit. A disease named as asthenopia is often heard, and this is considered to be a result of increased stimuli to the eyes in both quantity and quality and excessive adaptation caused in the eye function. The qualitative harmful stimuli adversely affect the eyes before we avoid them and are considered to be a trigger for transition to the so-called occupational disease and psychosomatic disorder.

Such diseases are generally considered to be caused by stress, but in the case of the eyes, how the people see things is important, and naturally, the most important thing is to avoid unnecessary stimuli and to enhance the motivation to see. Stress is like a vicious cycle repeated by both of them and it is desirable to minimize the causes. In case you fall into a stress, to break the aforementioned vicious cycle will be a target for curing in a sense.

The glasses of this invention eliminate the factors harmful to the eyes by means of lenses, and it is presumed that theoretically it has the effect of alleviating fatigue.

We cannot say that the fatigue of the eyes due to VDT work is caused only by harmful light stimulus, but the effect of eliminating one factor inducing the adverse effect will not be simply arithmic. This is, it is expected to be helpful in alleviating the stiffness of the shoulders and sense of bodily fatigue. I intend to make a clinical report on the users of this invention including such secondary effects.

Soon after television was invented, it was said that to watch the screen for a long time is not good for eyes. After a while, when the "door-key child" became a common phrase and shortsightedness increased among children, the TV was cited as the cause.

About 14-15 years ago, the National Railways partially changed the time board background from white to black and the letters and figures were seen afloat and white, and at that time, the human engineering specialists and psychologists said that to watch it for a long time would promote fatigue of the eyes. Surely they look conspicuous from a distance but up close, the black background dilates the pupils and white rays enter them giving excessive stimulus promoting fatigue.

Fatigue of the eyes due to VDT seems to be caused partially by the system in which the letters are floated on the screen by the light. Also, the distance between the screen and operator and the longtime watching seem to be the cause. Naturally, the eyes have adaptability, but if the stimulus is excessive, fatigue also occurs.

Already such measures as to brighten the room lighting and to change the color tone of the wall have been taken but these alone are not sufficient.

Table 5 shows the eye fatigue of the operator after the work when the glasses of this invention are used and when the glasses of this invention are not used in the VDT operations.

TABLE 5

| Eye Fatigue after Work | | |
|---|---|---|
| | Used | Not used |
| Eyesight | 0.8(no change) | (no change) |
| Near distance | 12.0-(no change) | 12.0-(no change) |
| Eye fatigue | Light fatigue | Heavy fatigue |
| Change in concentration | — | — |
| Body fatigue | No | Recognized |

Table 6 is a list of Subjective Symptoms, and Table 7 is a result of detailed investigation on the eyes of Table 6.

TABLE 6

Investigation on Subjective Symptoms
(by Japan Industrial Health Society Industrial Fatigue Research Conference)

| | | Not used: O | Used: ▲ |
|---|---|---|---|
| | I | | |
| 1 | Heavy feeling in the head | | |
| 2 | Entire body languid | | ▲ |
| 3 | Legs languid | | |
| 4 | Yawning | | |
| 5 | Fuddled brain | | |
| 6 | Sleepiness | O | |
| 7 | Eyes tired | O | |

TABLE 6-continued

Investigation on Subjective Symptoms
(by Japan Industrial Health Society Industrial Fatigue Research Conference)

| | | Not used: O | Used: ▲ |
|---|---|---|---|
| 8 | Motion clumsy | | |
| 9 | Unsteady gait | | |
| 10 | Want to lie down | O | ▲ |
| | II | | |
| 11 | Difficulty in thinking clearly | | |
| 12 | Do not like to speak | | |
| 13 | Irritated | O | ▲ |
| 14 | Attention distracted | O | |
| 15 | Cannot be absorbed in one thing | O | ▲ |
| 16 | Cannot remember a small thing | O | |
| 17 | Make many mistakes | O | ▲ |
| 18 | Too concerned about a thing | | |
| 19 | Cannot straighten up | | ▲ |
| 20 | Lack patience | | |
| | III | | |
| 21 | Headache | | |
| 22 | Stiff shoulders | O | ▲ |
| 23 | Painful waist | | |
| 24 | Feel choked | | |
| 25 | Become thirsty | | |
| 26 | Become husky | | |
| 27 | Feel dizzy | | |
| 28 | Twitching of eyelids and muscles | | |
| 29 | Legs and hands shaky | | |
| 30 | Feel bad | O | |

TABLE 7

Concerning 7 in Table 6, answer "yes" or "no" relative to your present condition.

| | |
|---|---|
| Do you feel ache behind your eyes? | Yes |
| Do you feel bleary eyed? | Yes |
| After continuously watching the screen, do the letters remain visible for a while or does the wall look colored? | No |
| Do tears come often? | No |
| Are your eyes so tired that you do not watch the TV? | Yes |
| Is it sometimes painful to keep your eyes opened? | Yes |

In order to measure the change in concentration shown in Table 5, it was thought better to use the Kraepelin census, but it was considered impossible to eliminate the exercise effect because the examination interval is too short, and the degree of relaxation was measured. For the detector, the alpha wave bio-feedback system, Mind Junic manufactured by Management Work Company was used and the change of brain waves was observed. As a result, it was known that the increase of the alpha wave and decrease of the beta wave was observed and ease in concentrating due to reduced fatigue was shown after the glasses of the invention were used.

TABLE 8

| Alpha Wave Appearance % Table | | | | |
|---|---|---|---|---|
| Total time | 600 seconds | 100% | Maximum (uV) | Mean (uV) |
| Beta | 228 seconds | 38% | 12 | 5.44667 |
| Alpha 3 | 20 | 3.33333% | 16 | 4.42667 |
| Alpha 2 | 166 | 27.6667% | 18 | 6.20667 |
| Alpha 1 | 68 | 11.3333% | 14 | 5.21 |
| Theta | 118 | 19.6667% | 22 | 6.22667 |

Total (alpha 1-3) 254 seconds 42.3333%
Noise (EMG, EOG, etc.) 0 second
Effective time 600 seconds

TABLE 9

| | Alpha Wave Appearance % Table | | | |
|---|---|---|---|---|
| Total time | 600 seconds | 100% | Maximum (uV) | Mean (uV) |
| Beta | 332 seconds | 55.3333% | 15 | 5.19 |
| Alpha 3 | 28 | 4.66667% | 20 | 4.33 |
| Alpha 2 | 144 | 24% | 15 | 5.56 |
| Alpha 1 | 70 | 11.6667% | 12 | 4.70333 |
| Theta | 26 | 4.33333% | 19 | 4.65667 |

Total (alpha 1-3) 242 seconds 40.3333%
Noise (EMG, EOG, etc.) 0 second
Effective time 600 seconds Table 10 shows the judgement by means of the CMI health study table, and in this case, too, both the physical and mental symptoms are less apparent after the glasses of this invention are used and the tendency to become stable from semi-normal to normal type is seen.

TABLE 10

| CMI (Judgement by Mashima method) | | |
|---|---|---|
| | Used | Not used |
| Physical symptom | 6.1% | 16.3% |
| Mental symptom | 1.9% | 21.5% |

FIG. 14 shows the result of the Y-G character examination, and after the use of the glasses of this invention, the cooperativeness and introspective tendency are intensified and the activeness is decreased, but this seems to be caused by other factors than use of the glasses of this invention. Even if they are considered to be caused by the use of the glasses of this invention, they will be "transient confusion" and will be solved soon when you become accustomed to them.

What is claimed is:

1. A special lens for glasses for a wearer, which lens has been formed by cementing a polarizer having an angle to a lens for glasses on the side of the lens opposite the eyeball of the wearer by a bonding agent, said polarizer angle being obtained by adding 90° to an astigmatic angle of the eyeball when the astigmatic angle is in the range from 0° to 90°, which astigmatic angle is obtained by measuring and calculating the astigmatic angle of the eyeball of the wearer, and said polarizer angle being obtained by subtracting 90° from the astigmatic angle when the astigmatic angle is in the range of more than 90° to 180°.

2. A special lens for glasses for a wearer, which lens has been formed by cementing a polarizer having an angle to a lens for glasses on the side of the lens at the eyeball of the wearer by a bonding agent, said polarizer angle being obtained by adding 90° to an astigmatic angle of the eyeball when the astigmatic angle is in the range from 0° to 90°, which astigmatic angle is obtained by measuring and calculating the astigmatic angle of the eyeball of the wearer, and said polarizer angle being obtained by subtracting 90° from the astigmatic angle when the astigmatic angle is in the range of more than 90° to 180°.

3. A special lens for glasses for a wearer, which lens has been formed by cementing a polarizer having an angle between a lens for glasses and another lens by a bonding agent, said polarizer angle being obtained by adding 90° to an astigmatic angle of the eyeball when the astigmatic angle is in the range from 0° to 90°, which astigmatic angle is obtained by measuring and calculating the astigmatic angle of the eyeball of the wearer, and said polarizer angle being obtained by substracting 90° from the astigmatic angle when the astigmatic angle is in the range of more than 90° to 180°.

4. A special lens for glasses for a wearer, which lens has been formed by incorporating and processing a polarizer having an angle to the inside of a lens for glasses, said polarizer angle being obtained by adding 90° to an astigmatic angle of the eyeball when the astigmatic angle is in the range from 0° to 90°, which astigmatic angle is obtained by measuring and calculating the astigmatic angle of the eyeball of the wearer, and said polarizer angle being obtained by subtracting 90° from the astigmatic angle when the astigmatic angle is in the range of more than 90° to 180°.

5. A special lens as defined by claim 4, wherein the upper portion of the lens is brighter than the lower portion thereof.

6. A pair of glasses for a wearer, including a special lens which has been formed by cementing a polarizer having an angle to a lens for glasses on the side of the lens opposite the eyeball of the wearer by a bonding agent, said polarizer angle being obtained by adding 90° to an astigmatic angle of the eyeball when the astigmatic angle is in the range from 0° to 90°, which astigmatic angle is obtained by measuring and calculating the astigmatic angle of the eyeball of the wearer, and said polarizer angle being obtained by subtracting 90° from the astigmatic angle when the astigmatic angle is in the range of more than 90° to 180°.

7. A pair of glasses for a wearer, including a special lens which has been formed by cementing a polarizer having an angle to a lens for glasses on the side of the lens at the eyeball of the wearer by a bonding agent, said polarizer angle being obtained by adding 90° to an astigmatic angle of the eyeball when the astigmatic angle is in the range from 0° to 90°, which astigmatic angle is obtained by measuring and calculating the astigmatic angle of the eyeball of the wearer, and said polarizer angle being obtained by subtracting 90° from the astigmatic angle when the astigmatic angle is in the range of more than 90° to 180°.

8. A pair of glasses for a wearer, including a special lens which has been formed by cementing a polarizer having an angle between a lens for glasses and another lens by a bonding agent, said polarizer angle being obtained by adding 90° to an astigmatic angle of the eyeball when the astigmatic angle is in the range from 0° to 90°, which astigmatic angle is obtained by measuring and calculating the astigmatic angle of the eyeball of the wearer, and said polarizers angle being obtained by substracting 90° from the astigmatic angle when the astigmatic angle is in the range of more than 90° to 180°.

9. A pair of glasses for a wearer, including a special lens which has been formed by incorporating and processing a polarizers having an angle to the inside of a lens for glasses, said polarizer angle being obtained by adding 90° to an astigmatic angle of the eyeball when the astigmatic angle is in the range from 0° to 90°, which astigmatic angle is obtained by measuring and calculating the astigmatic angle of the eyeball of the wearer, and said polarizer angle being obtained by subtracting 90° from the astigmatic angle when the astigmatic angle is in the range of more than 90° to 180°.

* * * * *